Oct. 10, 1933.  H. J. MURPHY  1,930,230
LUBRICATING APPARATUS
Original Filed Jan. 9, 1926

Inventor
Howard J. Murphy
By
Williams Bradbury McCaleb & Hinkle
Attys.

Patented Oct. 10, 1933

1,930,280

UNITED STATES PATENT OFFICE 1,930,280

LUBRICATING APPARATUS

Howard J. Murphy, Reading, Mass., assignor, by mesne assignments, to Alemite Corporation, a corporation of Delaware Original application January 9, 1926, Serial No. 80,247, now Patent No. 1,716,502, dated June 11, 1929. Divided and this application filed January 17, 1929. Serial No. 333,226

13 Claims. (Cl. 184—7)

This invention relates to lubricating apparatus and more particularly to the charge determining devices of so-called centralized systems. Centralized lubricating systems comprise, in general, a lubricant reservoir or other source of lubricant supply, a pump supplied from said reservoir, a conduit or conduits leading from the pump to the bearings to be lubricated, and a charge determining device adjacent each bearing and regulating the quantity of lubricant supplied thereto by the pump.

An object of this invention is to provide a new and improved charge determining device which will be economical to manufacture and efficient and absolutely reliable in operation.

Other objects and advantages will appear as the description proceeds.

In the drawing, which illustrates a preferred embodiment of my invention,

Figure 1:
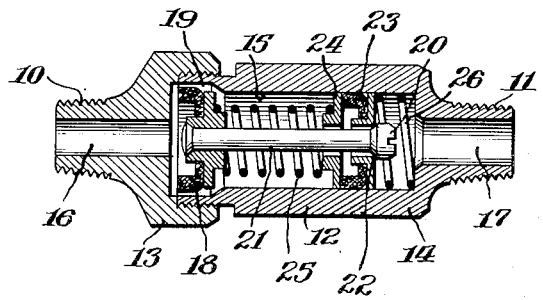
Figure 1 is a section of one of my charge determining lubricant devices, showing the relation of the parts when the charge determining chamber is being filled with lubricant.
Figure 2:
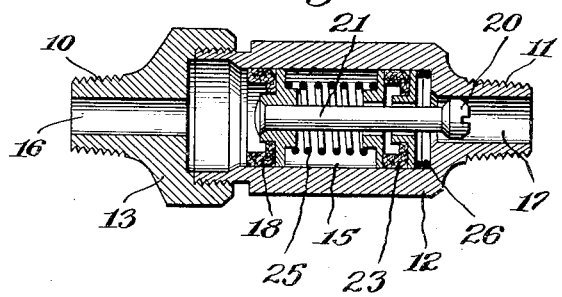
Figure 2 is a section of a charge determining lubricant device similar to that shown in Figure 1 but showing the relation of the parts as the lubricant is being forced from the device.

Referring to Figures 1 and 2 of the drawing, I have shown a charge determining device having an end 10 adapted to be connected to a lubricant conduit leading from the pump of the centralized lubricating system and having an outlet end 11 adapted to be connected to the bearing to be lubricated. The charge determining device is illustrated as comprising a body portion designated, in general, by the numeral 12 and formed of two separable parts 13 and 14 threaded together to present a lubricant measuring chamber 15, an inlet 16 and an outlet passage 17.

Within the chamber 15 is arranged a piston 18 and valve means. In Figure 1 the piston is shown in its normal position wherein it rests within the enlarged part 19 of the chamber 15. The valve means includes a valve 20 at the end of a valve stem 21, secured to the piston 18, and a valve seat part 22 surrounding the stem 21. A cup washer 23 is provided to prevent leakage of lubricant around the outer periphery of the valve part 22. A metal washer 24 surrounds the stem 21 and presses against the cup washer 23, and a spring 25 is interposed between the piston 18 and the washer 24 normally to keep the valve 20 against its seat, as illustrated in Figure 1. A relatively weak spring 26 is interposed between the wall at the outlet end of the chamber 15 and the valve seat part 22 normally to urge the valve means and piston as a unit toward the inlet end of the chamber to the position illustrated in Figure 1.

When lubricant is admitted to the centralized system, of which my charge determining device forms a part, the lubricant enters the inlet passage 16 and flows around the piston into the chamber 15 because of the enlargement 19 at the inlet end thereof which provides a space between the periphery of the piston and the adjacent wall of the chamber. As the valve 20 is normally closed, as illustrated in Figure 1, the lubricant is trapped in the chamber 15 until this chamber becomes filled. Then the lubricant acts upon the piston and valve means and forces the whole as a unit against the pressure of the spring 26 to move the piston 18 out of the enlargement 19 and close the space around the piston and thus cut off communication between the chamber 15 and the source of lubricant supply. Immediately after the supply of lubricant to the chamber 15 is thus cut off by the piston 18, the spring 26 becomes fully compressed and provides a stop against further movement of the valve seat part 22, cup washer 23 and washer 24. The pressure of the lubricant in the system continues to act on the piston 18 and as this piston is forced farther into the chamber 15, it unseats the valve 20 and since the diameter of the stem 21 is smaller than the hole through the valve part, the lubricant in the chamber 15 in rear of the piston 18 may be forced from the chamber through the outlet passage 17 to the part to be lubricated.

An important feature of my charge determining device is the arrangement of parts together with the use of a cup washer as part of the piston 18 to permit absolutely cutting off the passage of lubricant around the piston to the chamber 15 prior to opening the valve 20, thereby insuring the forcing of a measured quantity of lubricant from the cup at each operation. The cup leather of the piston permits passage of lubricant from the chamber 15 to the inlet side of the piston 18 during the movement of the piston from the time it cuts off the supply of lubricant to the chamber until the valve opens. Thereafter the lubricant presses the cup leather against the wall of the chamber 15 and prevents further leakage so that all of the lubricant may be forced out of the chamber.

Figure 3:
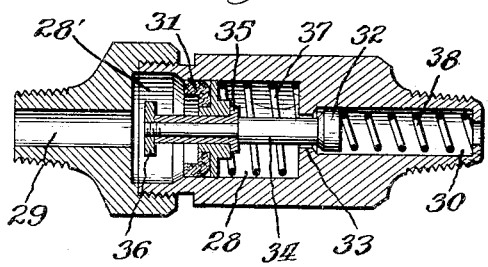
Figure 3 is a sectional view of a modified form of charge determining device.

Figure 3 illustrates a second form of lubricant measuring device for use as part of a centralized lubricating system. While this lubricant measuring or charge determining device is constructed in a slightly different manner its operation is substantially the same as shown and described in connection with the device illustrated in Figures 1 and 2.

The charge determining device shown in Figure 3 includes a measuring chamber 28, inlet and outlet passages 29 and 30, respectively, a piston 31 and a valve 32 substantially as shown in Figures 1 and 2. In this instance, however, the valve seat 33 is formed integral with the body of the charge determining device between the chamber 28 and the outlet passage 30. Instead of the piston and valve stem being secured together, as in Figures 1 and 2, the piston 31 is here shown as slidable relative to the valve stem 34 and stops 35 and 36 are carried by the stem 34 to limit the movement of the piston relative to the stem. A spring 37 is interposed between the piston 31 and the wall at the end of the chamber 28 normally to urge the piston into the enlarged portion 28' of the chamber, and a second spring 38 is placed in the outlet passage 30 to press the valve 32 against its seat 33.

In operation, the lubricant first fills the chamber 28 except for the small space occupied by the slight amount of air therein; then moves the piston relative to the stem 34 to cut off further passage of lubricant into the chamber 28; then upon continued movement of the piston the small amount of air in the chamber 28 is compressed until the piston engages the stop 35; thereafter the piston moves the valve stem 34 to open the valve 32 against the pressure of the spring 38, thereby permitting the lubricant to flow from the chamber 28 through the passage 30 to the part to be lubricated. Upon the return stroke of the piston there is a tendency to form a vacuum back of the piston, and this action sucks some air and lubricant into the chamber 28 from the passage 30. After the valve 32 has closed further movement of the piston creates additional vacuum which is relieved after the piston has reached the enlarged portion 28' of the chamber.

This application is a division of my co-pending application, Serial No. 80,247 filed January 9, 1926, for Lubricating apparatus which was issued June 11, 1929 as Patent No. 1,716,502.

While I have shown and described a preferred embodiment of my invention, it will be understood that changes involving omission, substitution, alteration and reversal of parts, and even changes in the mode of operation, may be made without departing from the scope of my invention which is best defined in the following claims.

I claim:

1. A charge determining lubricant device having a lubricant measuring chamber, a piston for operation in said chamber, a valve part and valve seat part arranged at the outlet end of said chamber, a lost motion mechanical connection between said piston and one of said parts, said valve normally held closed by a spring but adapted to be opened by said piston subsequent to initial movement of said piston into said chamber.

2. A charge determining lubricant cup having a lubricant measuring chamber, an inlet passage and an outlet passage, a piston normally arranged at the inlet end of said chamber so that lubricant may flow from said inlet passage into said chamber, a valve seat at the outlet end of said chamber, a valve normally held against said seat by a spring, a piston normally urged toward the inlet end of said chamber by a spring, a valve stem passing through said piston and an abutment presented by said valve stem, said piston initially movable relative to said stem until it contacts with said abutment and said valve thereafter adapted to be unseated by further movement of said piston toward the outlet end of said chamber.

3. A measuring valve comprising a body having a measuring chamber, an inlet valve for said chamber, a spring normally holding said valve open, an outlet valve for said chamber, a spring normally holding said valve closed, and a lost motion mechanical connection between said valves to permit said inlet valve to close prior to the opening of said outlet valve.

4. A charge measuring device for use in a lubricating system comprising a measuring chamber having inlet and outlet ports, valves adapted to close said ports, a lost motion mechanical connection between said valves, means tending normally to hold said valves separated, and resilient means tending to close the valve over the outlet port of said chamber.

5. A charge measuring device for use in lubricating systems, comprising a measuring chamber having inlet and outlet ports, valves adapted to close said ports, a lost motion mechanical connection between said valves, a spring normally holding said valves separated, and a second spring normally holding the valve at said outlet port closed.

6. A charge measuring device for use in lubricating systems, comprising a measuring chamber having inlet and outlet ports, valves adapted to close said ports, a lost motion mechanical connection between said valves, and a spring normally holding the valve at said outlet port closed.

7. A charge measuring device for lubricating systems of the class described, comprising a measuring chamber having an inlet and an outlet, a valve adapted to close said inlet, a poppet valve adapted to close said outlet, spring means normally maintaining said inlet valve in open position and said outlet valve in closed position, said inlet valve movable in said chamber responsive to fluctuations in lubricant pressure, and mechanical means whereby said outlet valve is opened only upon a predetermined movement of said inlet valve after said inlet valve has cut off further inflow of lubricant into said chamber.

8. A charge determining lubricant cup having a lubricant measuring chamber, an inlet passage and an outlet passage, a piston normally arranged at the inlet end of said chamber so that lubricant may flow from said inlet passage into said chamber, spring pressed valve means adjacent to the outlet end of said chamber, said valve means normally closed and openable only subsequent to movement of said piston to cut off the supply of lubricant to said chamber, the valve part of said valve means being carried by said piston.

9. A charge determining lubricant cup having a lubricant measuring chamber, an inlet passage and an outlet passage, a piston normally arranged at the inlet end of said chamber so that lubricant may flow from said inlet passage into said chamber, a valve part carried by said piston, a valve seat part and a spring interposed between said valve seat part and said piston, said valve seat, said piston, said valve part and said spring adapted to be moved as a unit to cut off the supply of lubricant to said chamber, said piston and valve part continuing to move in said chamber relative to said valve seat part and against the pressure of said spring to open said valve and force the lubricant from said chamber.

10. A charge determining lubricant cup having a lubricant measuring chamber, an inlet passage and an outlet passage, a piston normally arranged at the inlet end of said chamber so that lubricant may flow from said inlet passage into said chamber, a valve part carried by said piston, a valve seat part and a spring interposed between said valve seat part and said piston, said valve seat, said piston, said valve part and said spring adapted to be moved as a unit to cut off the supply of lubricant to said chamber, said piston and valve part continuing to move in said chamber relative to said valve seat part and against the pressure of said spring to open said valve and force the lubricant from said chamber, and a relatively weak spring interposed between the valve seat part and the wall at the end of the chamber for normally urging the unit toward the inlet end of said chamber.

11. In lubricating apparatus of the class described, a metering device comprising in combination a body having a cylindrical measuring chamber provided with an enlargement at its inlet end, an integral outlet externally threaded, a cap threadedly engaging said body and partially covering said inlet, said cap having an externally threaded nipple, a piston provided with a single cup leather normally held in said inlet, poppet valve means normally preventing egress of lubricant from said chamber, a mechanical connection between said piston and valve means, a spring for urging said piston toward said inlet, and a second spring associated with said valve means.

12. In a device of the character described, a cylinder having a bore, connected pistons operating in the bore, the pistons and cylinder being shaped to permit fluid to flow past either one of the pistons while the other piston completely obstructs the bore, the space between the pistons constituting a measuring chamber, and the pistons being operable under fluid pressure to charge and discharge the measuring chamber.

13. A device of the character described, including a cylinder, relatively movable connected pistons arranged in the cylinder, the cylinder being shaped to permit fluid to flow past one of the pistons while the other piston completely obstructs the cylinder, the space between the pistons constituting a measuring chamber, and the pistons being operable under fluid pressure to charge and discharge the measuring chamber.

HOWARD J. MURPHY.